United States Patent [19]

Hagenlocher et al.

[11] 4,105,907

[45] Aug. 8, 1978

[54] SLIP RING STRUCTURE FOR DYNAMO ELECTRIC MACHINES, PARTICULARLY AUTOMOTIVE-TYPE ALTERNATORS

[75] Inventors: Walter Hagenlocher, Stuttgart; Karl-Heinz Neumann, Warmbronn; Martin Müller, Ludwigsburg; Karl Kleebaur, Allmersbach; Günter Sokol, Esslingen; Jürgen Molt, Stuttgart, all of Fed. Rep. of Germany

[73] Assignee: Robert Bosch GmbH, Stuttgart, Fed. Rep. of Germany

[21] Appl. No.: 717,529

[22] Filed: Aug. 25, 1976

[30] Foreign Application Priority Data

Sep. 3, 1975 [DE] Fed. Rep. of Germany ....... 2539091

[51] Int. Cl.[2] ............................................. H02K 39/08

[52] U.S. Cl. ..................................... 310/232; 310/263

[58] Field of Search ............... 310/232, 233, 234, 236, 310/263, 71, 194, 231, 235, 128, 237, 171

[56] References Cited

U.S. PATENT DOCUMENTS

| | | | |
|---|---|---|---|
| 394,797 | 12/1888 | Tregoning | 310/232 |
| 1,576,615 | 3/1926 | Paulero | 310/128 UX |
| 2,696,570 | 12/1954 | Pandapas | 310/232 |
| 2,950,403 | 8/1960 | Kilner | 310/232 |
| 2,985,781 | 5/1961 | Julian | 310/232 |
| 3,185,878 | 5/1965 | Reienecker | 310/232 |
| 3,271,604 | 9/1966 | Priddy | 310/71 |
| 3,603,825 | 9/1971 | Sheridan | 310/234 |
| 3,636,394 | 1/1972 | Forste | 310/232 |
| 3,686,514 | 8/1972 | Dube | 310/232 |

FOREIGN PATENT DOCUMENTS

| | | | |
|---|---|---|---|
| 1,961,788 | 6/1971 | Fed. Rep. of Germany | 310/232 |
| 37,382 | 7/1923 | Norway | 310/232 |

*Primary Examiner*—R. Skudy
*Attorney, Agent, or Firm*—Flynn & Frishauf

[57] ABSTRACT

A support carrier of electrically conductive material is secured to the shaft of the machine. A plurality of slip rings are secured to the support carrier, one of the slip rings being fixed thereto directly so that the support carrier will form one terminal of the electrical connection for the slip rings, and an insulating layer is placed over the support carrier over which the other slip ring is located. Preferably, the support carrier is formed with a flange which is notched, one of the notches serving to form an electrical connection for the wire of the field of the machine for connection to the slip ring which is directly secured to the support carrier, the other notch in the flange being wider and gripping around the insulation of the other wire of the field, the wire of the field then being connected to the slip ring which is carried on the insulation. That slip ring, preferably, is also formed with an external flange to which its connecting wire can be secured, for example by soldering. The support carrier may be a solid stub shaft for attachment to the shaft of the alternator, or a tube to be slipped thereover.

12 Claims, 6 Drawing Figures

SLIP RING STRUCTURE FOR DYNAMO ELECTRIC MACHINES, PARTICULARLY AUTOMOTIVE-TYPE ALTERNATORS

The present invention relates to a slip ring structure for dynamo electric machines, and more particularly for automotive-type alternators, to connect electrical power for the field structure of the alternator.

Three-phase alternators, particularly for automotive use, often are of the claw-pole type. Slip rings are provided to carry current to the field winding. Alternators for automotive use should be as small as possible for a given power output. One suitable place to save space is in the slip ring construction which should be held to be as small as possible. Reducing the size of slip ring arrangements on alternators, together with their insulation and the associated brush holder arrangement, poses difficulties due to the high mechanical loading arising in automotive alternator installations. Providing suitable electrical contacts to small slip rings also was difficult.

It is an object of the present invention to provide a slip ring structure which can be made in small dimensions while still having substantial mechanical stability, which has simple electrical contact arrangement and is reliable in operation, and which, in short, meets both the mechanical as well electrical requirements placed on automotive-type alternators which operate in highly variable and severe environments.

Subject matter of the present invention: Briefly, a support carrier of circular cross section is provided; this carrier may be a solid element, or may be hollow to fit over the alternator shaft. One of the slip rings is directly secured to the support carrier so that the support carrier, which is made of metal, forms one terminal for the field winding of the alternator. The support carrier has an insulating coating or sleeve and forming an insulating layer placed partially thereover, over which the second slip ring is located. Preferably, the support carrier is formed with a flange which has two notches, one, a small one for connection of one of the wires from the field thereto, to form the field wire terminal, and the other somewhat larger to crimp around the insulation of the second terminal wire from the field, so that the field cable is held in position, the conductive core of which can be attached to the second slip ring.

The invention will be described by way of example with reference to the accompanying drawings, wherein.

Figure 1:
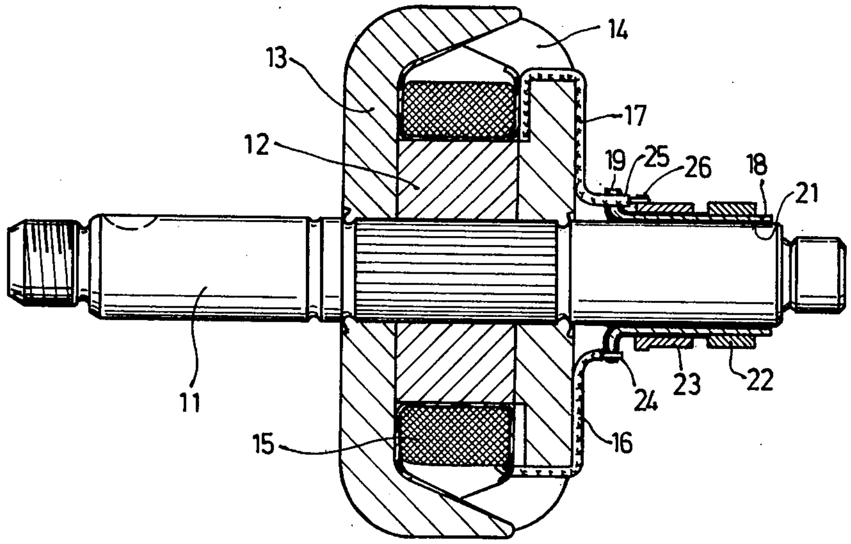
FIG. 1 is a schematic fragmentary cross-sectional view through an alternator field structure and illustrating one embodiment of the slip ring arrangement.

The claw-pole rotor of an alternator is secured to a shaft 11; the remainder of the alternator structure is not shown and may be of a well-known type. The pole core 12 is surrounded by claw poles 13, 14 (FIG. 1) between which the field winding 15 is located. The field winding 15 receives power over two insulated connecting wires or cables 17, 16 each having a conductive core.

A sleeve-like support carrier 18 is fitted over the shaft 11. Carrier 18 is formed, at the inside, with a flange 19. Two cylindrical slip rings 22, 23 are supported on carrier 18.

Figure 3:
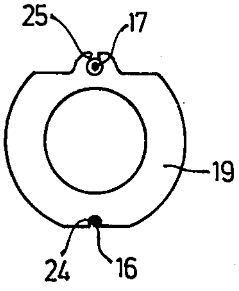
FIG. 3 is a rear end view showing the flange for attachment of the field cables.

Carrier 18, as shown in FIG. 1, is made of metal. An insulating layer 21 is placed partially over its axial length to provide an insulating layer on the carrier 18 and insulate the layer 18 with respect to shaft 11, as well as with respect to the second slip ring 23. The layer 21, therefore, extends beneath the sleeve 18 as well as partially thereover. The slip ring 22 is secured to a metallic portion of the carrier 18, and thus is electrically connected to carrier 18. Slip ring 23 is located above the outer insulating layer 21 and thus is insulated with respect thereto. Flange 19 is formed with two notches 24, 25 (FIG. 3). Notch 24 is a small notch to accept the wire core of connecting wire or cable 16, and thus to effect connection of wire 16 through carrier 18 to the first slip ring 22. The second notch 25 is wider and secures the second connecting wire 17 in position. The cable insulation of the wire 17 is left thereon, so that the second connecting wire is insulated with respect to the flange 19, and thus with respect to the carrier 18. The second slip ring 23 is formed with a flange 26 in which a notch is located in which the core wire of the second connecting cable or wire 17 is secured, both mechanically as well as electrically, for example by spot-welding, soldering, brazing, or the like.

Figure 2:
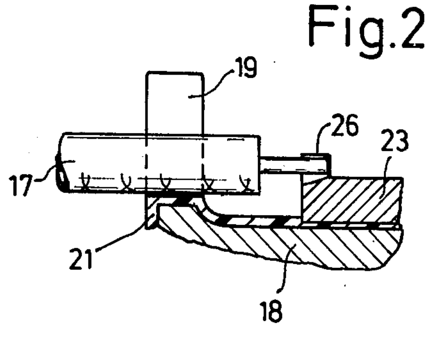
FIG. 2 is a fragmentary view of the contacting arrangement, shown to a greatly enlarged scale.

FIG. 2 illustrates the connection of wire 17 in greater detail, showing placement of wire 17 in notch 25 of the flange 19 and connection to the notch formed in the flange 26 of slip ring 23.

Figure 5:
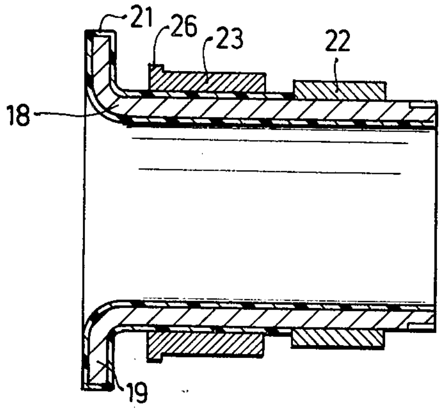
FIG. 5 is a cross-sectional view of a slip ring structure similar to that of FIG. 1, but illustrating a further embodiment.

The arrangement may be varied in several respects. FIG. 5, for example, illustrates sleeve 18, insulated with insulation 21 to which slip ring 22 is secured. Slip ring 23 is located on the insulation 21. Sleeve 18 is formed integrally with the flange 19. The flange may also be constructed as a separate ring, as shown in FIG. 3, and separately attached to a tubular sleeve. The slip rings 22, may be made of copper.

Figure 6:
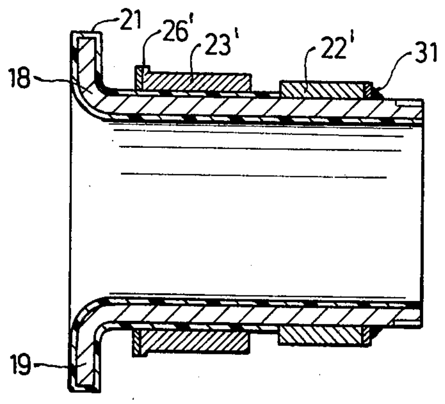
FIG. 6 is a view similar to FIG. 5, and illustrating yet another embodiment.

FIG. 6 shows an embodiment in which slip rings 22′ and 23′ are made of graphite. The graphite slip rings 22′, 23′ have a copper edging at one side. The copper edging of the slip ring 22′ is located, preferably, on the side remote from the core 12 where the first slip ring is secured by means of solder 31 to the support carrier sleeve 18. The copper insert of the second slip ring 23′ is preferably located adjacent its flange 26′, to permit ready connection of the second cable or wire 17 thereto. The second slip ring can be secured to the insulating layer 21 by adhesives, for example.

Figure 4:
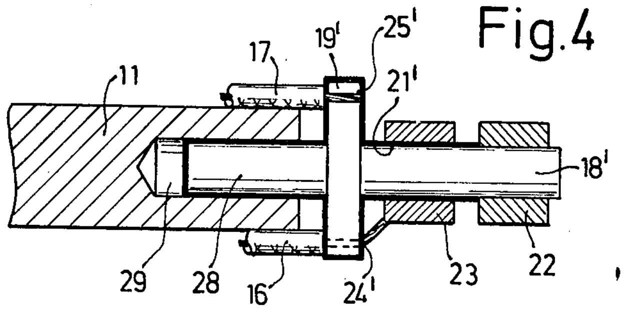
FIG. 4 is a fragmentary axial cross-sectional view of another embodiment in accordance with the present invention.

FIG. 4 illustrates another embodiment in which the support carrier 18′ is a bolt with a flange intermediate its length. Bolt 18′ is formed with an extension 28. Bolt 18′ is insulated by means of insulating layer 21′. Bolt 18′ fits into an axial bore drilled into the end of shaft 11. Notches 24′, 25′ correspond to the notches 24, 25 of the flange 19 of FIG. 1, to which also flange 19′ of FIG. 4 corresponds.

The slip ring structure has the advantage that it can be made very small, while being mechanically stable, and can be made, further, as a separate assembly. The electrical contacting is simple and reliable in operation, and mechanical and electrical properties are well adapted to the rough operating conditions in automotive vehicles.

The arrangement permits connecting the contact wires or cables to the slip rings directly so that further attachment arrangements for the contacting wires are not needed. There is no necessity to form a groove in the shaft or in one of the slip rings, as was heretofore required. Provision of flange 19 as described permits easy attachment and mechanical holding of the connecting cable, for example by deformation and pinching the cable wire 17 around its insulation, thus providing an attachment for the blank wire 16 at notch 24, as well as for the insulated wire 17 at notch 25. FIG. 3 illustrates the deformation of the areas of the flange 19 adjacent the notch 25. Preferably, the flange 19 is cut away to leave projecting fingers which can be deformed to grip the cable or wire 17, thus avoiding the necessity of constructing separate holding arrangements, and mechanically securing the attachment wire while permitting electrical connection to slip ring 23 which is insulated from the flange as well as from the support sleeve 18. The arrangement is particularly adaptable to nonmetallic slip rings such as, preferably, graphite slip rings. Graphite slip rings cannot be deformed to provide a mechanical attachment of the connecting lines or the wires.

Various changes and modifications may be made, and features described in connection with any one of the embodiments may be used with any of the others, within the scope of the inventive concept.

We claim:

1. Slip ring structure for assembly to a shaft of a dynamo electric machine comprising a support carrier (18) of electrically conductive material and having a circular cross section secured to the shaft (11) of the machine;

a plurality of cylindrical slip rings (22, 23) secured to the support carrier (18), one of said slip rings being attached directly to the electrically conductive material (18) of the support carrier, said support carrier forming one electrical connection for a first slip ring (22), and an insulating layer (21) interposed between said electrically conductive material of the support carrier and a second slip ring (23) insulating said second slip ring (23) with respect to the electrically conductive material of the support carrier (18).

2. Structure according to claim 1, wherein the shaft (11) of the dynamo electric machine carries a winding (15);

connecting wires (16, 17) comprising a conductive core and an insulating layer thereover extending from the winding (15);

and the support carrier (18) of electrically conductive material having a flange (19) formed with two notches (24, 25), one of the notches having a dimension to receive the core of one of the connecting wires (16) from the winding, and the other of the notches (25) having a dimension to receive the other connecting wire (17) including its insulation layer, to secure another wire (17) to the flange (19).

3. Structure according to claim 1, wherein the support carrier comprises a sleeve (18) telescoped over the shaft (11) of the machine.

4. Structure according to claim 1, wherein the support carrier (18') comprises a bolt-like element having a flange (19') secured intermediate its length;

the shaft (11) of the machine is formed with a central bore, and a portion of the bolt-like element is inserted in the bore of the shaft.

5. Structure according to claim 4, wherein the diameter of the flange is greater than the diameter of the shaft;

said flange (19') being formed with notches for connecting wires (16, 17) of at least a winding (15) on the shaft (11).

6. Structure according to claim 1, wherein the slip rings (22, 23) are copper slip rings, and the slip ring (23) secured over the insulating means (21) is formed with a flange (26), said flange having a notch for mechanical and electrical attachment of a connecting wire (17) of a winding (15) located on the shaft (11) of the machine.

7. Structure according to claim 1, wherein the slip rings (22', 23') are graphite slip rings formed with copper inserts located laterally of at least one side thereof to form a copper edging, and wherein the slip ring (23') secured to the insulating means (21) is formed with a flange (26'), the flange including a notch for electrical connection of connecting wire (17) of a winding (15) located on the shaft (11) of the machine.

8. Structure according to claim 2, wherein the flange (19) is formed with relieved portions adjacent the larger notch (25) accepting the insulated connecting wire (17) to permit deformation of the material of the flange (19) adjacent said notch (25) for mechanical attachment and gripping of the insulated connecting wire (17) around the insulation thereof after placement of the wire in the notch (25).

9. Structure according to claim 1, wherein the insulation means comprises an electrical insulation sleeve located at least at the outer circumference of said support carrier (18).

10. Structure according to claim 1, wherein said insulation means (21) comprises an insulation layer at the side of said support carrier engaging the shaft (11) as well as in the region of the support carrier beneath said other slip ring (23) to insulate the support carrier (18) and the slip ring (22) directly connected thereto from the shaft (11) of the machine as well as to insulate the slip rings (22, 23) on the support carrier from each other.

11. Automotive alternator having a shaft (11);

a claw pole field structure supported on the shaft including a field winding (15) and connecting wires (16, 17) extending from the field winding, and a slip ring structure as claimed in claim 1 secured to said shaft said alternator forming the dynamo electric machine, and wherein two slip rings are provided, one of the connecting wires (16) being electrically connected to said electrically conductive support carrier and, hence, electrically connected to one of the two slip rings, the other connecting wire (17) being connected to the other slip ring (23).

12. Automotive alternator as claimed in claim 11, wherein the connecting wires comprise, each, a conductive core and an insulating layer thereover;

and the support carrier (18) of electrically conductive material has a flange (19) formed with two notches (24, 25) one of the notches having a dimension to receive the core of one of the connecting wires (16) from the field winding (15), the other of the notches (25) having a dimension to receive the other connecting wire (17) including its insulation layer, to secure the other wire (17) to the flange (19).

* * * * *